United States Patent
Kamimura et al.

(10) Patent No.: US 7,421,982 B2
(45) Date of Patent: Sep. 9, 2008

(54) INDEPENDENT COMBUSTION CHAMBER-TYPE INTERNAL COMBUSTION ENGINE

(76) Inventors: Ichiro Kamimura, 5-9-21, Kawauchi, Asaminami-ku, Hiroshima (JP) 731-0102; Kazunari Kamimura, 5-9-21, Kawauchi, Asaminami-ku, Hiroshima (JP) 731-0102; Masahiro Kamimura, 5-9-21, Kawauchi, Asaminami-ku, Hiroshima (JP) 731-0102

( * ) Notice: Subject to any disclaimer, the term of this patent is extended or adjusted under 35 U.S.C. 154(b) by 0 days.

(21) Appl. No.: 11/570,324

(22) Filed: Dec. 8, 2006

(65) Prior Publication Data
US 2007/0272200 A1  Nov. 29, 2007

Related U.S. Application Data

(63) Continuation of application No. PCT/JP2005/009951, filed on May 31, 2005.

(30) Foreign Application Priority Data

Jun. 10, 2004  (JP) .............................. 2004-172712
Oct. 26, 2004  (JP) .............................. 2004-311072

(51) Int. Cl.
*F02B 19/02*  (2006.01)
*F02B 47/04*  (2006.01)
*F02B 55/14*  (2006.01)
*F02M 25/022*  (2006.01)

(52) U.S. Cl. ..................... 123/25 A; 60/39.6; 60/39.62; 123/228; 123/292

(58) Field of Classification Search ............... 123/25 A, 123/25 C, 25 E, 228, 255, 256, 292; 60/39.6, 60/39.62, 39.63
See application file for complete search history.

(56) References Cited

U.S. PATENT DOCUMENTS 3,886,734 A * 6/1975 Johnson ..................... 60/39.63
4,015,424 A * 4/1977 Shinohara ................... 60/39.6
5,237,964 A * 8/1993 Tomoiu ..................... 123/292

FOREIGN PATENT DOCUMENTS

| JP | 50-25963A A1 | 8/1975 |
| JP | 02-119616 A1 | 7/1990 |
| JP | 04-124423 A1 | 4/1992 |

(Continued)

*Primary Examiner*—T. M. Argenbright
(74) *Attorney, Agent, or Firm*—Cochran Freund & Young LLC; James R. Young

(57) ABSTRACT

The present invention is directed to an internal combustion engine for making suction, compression, explosion, expansion and exhaust strokes in an operating chamber of variable volume defined between a housing and a piston. The internal combustion engine includes: an independent combustion chamber of fixed volume, formed in the housing and provided with a fuel supply device, for independently producing combustion therein; at least one communication passage for communicating the independent combustion chamber with the operating chamber of variable volume; and a control valve for allowing introduction of compressed air from the operating chamber into the independent combustion chamber and providing injection of combustion gas from the independent combustion chamber into the operating chamber at specified timing. The internal combustion engine is configured to independently produce main combustion without communication with the operating chamber. Thus, the internal combustion engine can achieve a high compression ratio without causing damage to engine components due to knocking.

12 Claims, 10 Drawing Sheets

FOREIGN PATENT DOCUMENTS

| | | |
|---|---|---|
| JP | 04-194314 A1 | 4/1992 |
| JP | 05-033651 A1 | 2/1993 |
| JP | 06-193446 A1 | 7/1994 |
| JP | 06-288249 A1 | 10/1994 |
| JP | 07-127453 A1 | 5/1995 |
| JP | 09-268915 A1 | 10/1997 |
| JP | 2001-173446 | 6/2001 |
| JP | 2002-266645 A1 | 9/2002 |
| JP | 2004-211633 A1 | 7/2004 |

* cited by examiner

Stroke 1

Stroke 2

-45°

Stroke 3

-30°

Stroke 4

-15°

Stroke 5

-10°

Stroke 6

-0°

Stroke 7

+10°

Stroke 8

+15°

Stroke 9

+30°

Stroke 10

+45°

Stroke 11

+60°

Stroke 12

+180°
−180°

INDEPENDENT COMBUSTION CHAMBER-TYPE INTERNAL COMBUSTION ENGINE

TECHNICAL FIELD

This invention generally relates to internal combustion engines and particularly relates to high-compression, independent combustion chamber internal combustion engines.

BACKGROUND ART

Generally, internal combustion engines are roughly classified into spark ignition internal combustion engines (Otto cycle internal combustion engines) and compression ignition internal combustion engines (diesel cycle internal combustion engines). Spark ignition internal combustion engines are configured to compress a mixture of intake air and fuel in an operating chamber serving as a combustion chamber and then ignite the air-fuel mixture with a spark plug to burn it. On the other hand, compression ignition internal combustion engines are configured to inject fuel into air raised to a high temperature by compression to ignite and burn the fuel by the heat of compression.

Patent Document 1: Published Japanese Patent Application No. 2004-211633

DISCLOSURE OF THE INVENTION

Problems to Be Solved by the Invention

The thermal efficiency of internal combustion engines of the above types largely depends on their compression ratio. In this respect, compression ignition internal combustion engines offering higher compression, i.e., diesel cycle internal combustion engines, have higher thermal efficiency and are more advantageous in fuel efficiency. Specifically, in spark ignition internal combustion engines, the compression ratio cannot excessively be increased because of the possibility of occurrence of so-called knocking, particularly spark knock, and is actually set at about 10 to 12. Diesel internal combustion engines, the compression ratio of which can be set at about 22 to 23, have higher thermal efficiency accordingly.

Also in diesel internal combustion engines, however, a knocking phenomenon called diesel knock may occur though it has a different occurrence mechanism from in spark ignition internal combustion engines. These phenomena of spark knock and diesel knock, in either case, cause the air-fuel mixture to burn at a burning speed closer to explosion rather than combustion, thereby producing an extremely high shock wave.

The shock wave may cause fatal damage to the engine, such as breakage of a piston ring or breakage of a piston itself. Therefore, the conventional engines, regardless of whether they are spark ignition internal combustion engines or compression ignition internal combustion engines, i.e., regardless of engine ignition type, have a limitation on increasing their compression ratio on the ground of the possibility of damage to the engines due to knocking.

The present invention has been made in view of the above points and has its object of providing an internal combustion engine achieving a high compression ratio without causing any damage to engine components due to knocking.

Means to Solve the Problems

To attain the above object, a first solution of the present invention is directed to an internal combustion engine for making suction, compression, explosion, expansion and exhaust strokes in an operating chamber of variable volume defined between a housing and a piston, the internal combustion engine comprising: an independent combustion chamber of fixed volume, formed in the housing and provided with a fuel supply device, for independently producing main combustion therein; at least one communication passage for communicating the independent combustion chamber with the operating chamber of variable volume; and a control valve for allowing introduction of compressed air from the operating chamber into the independent combustion chamber and providing injection of combustion gas from the independent combustion chamber into the operating chamber at specified timing after top dead center of a compression stroke, wherein the control valve is configured to close the communication passage within a predetermined range near the top dead center of the compression stroke and including a fuel injection timing of the fuel supply device and the top dead center of the compression stroke to thereby independently produce main combustion in the independent combustion chamber without communication with the operating chamber.

EFFECTS OF THE INVENTION

According to the first solution of the present invention, main combustion in the independent combustion chamber is produced independently with the independent combustion chamber isolated from the operating chamber. Therefore, even if abnormal combustion due to early ignition occurs in the independent combustion chamber set at a high compression ratio, a shock wave due to the abnormal combustion acts directly within the independent combustion chamber and does not act directly on the surface of the piston defining the operating chamber. Thus, the pressure of combustion gas in the independent combustion chamber is smoothed within the independent combustion chamber and the combustion gas is injected into the operating chamber at the specified timing. Though the high-pressure combustion gas acts on the piston surface, the shock wave due to knocking does not directly act thereon, thereby avoiding damage to the piston and parts connecting to the piston, such as breakage thereof. Hence, a high compression ratio can be achieved thereby significantly improving combustion efficiency. When gasoline is used as fuel, low-octane gasoline can be used. When light oil or heavy oil is used as fuel, the cetane rating need not be regulated.

In a second solution of the present invention, the communication passage comprises a single communication passage. With this configuration, the structure surrounding the independent combustion chamber can be simplified.

A third solution of the present invention is directed to an internal combustion engine of the first solution, wherein the communication passage for every one said independent combustion chamber comprises a first communication passage and a second communication passage both communicating with said independent combustion chamber, the first communication passage is provided with a first control valve for allowing injection of combustion gas from the independent combustion chamber into the operating chamber at the specified timing, and the second communication passage is provided with a second control valve for allowing compressed working gas to flow from the operating chamber into the independent combustion chamber and inhibiting combustion gas from flowing out of the independent combustion chamber into the operating chamber. With this configuration, the introduction of compressed gas from the operating chamber into the independent combustion chamber and the injection of combustion gas from the independent combustion chamber to the operating chamber can be controlled independently of each other, which makes the combustion efficiency still higher.

A fourth solution of the present invention is directed to an internal combustion engine of the third solution, wherein the first control valve is constituted as a sub piston formed on the piston reciprocating in the housing. With this configuration, the timing to inject combustion gas from the independent combustion chamber is controlled by the sub piston formed on the piston according to the reciprocating movement of the piston. Therefore, the engine structure can be simplified compared to that using electric control. In fifth and sixth solutions of the present invention, the independent combustion chamber internal combustion engine comprises a reciprocating internal combustion engine and a rotary internal combustion engine, respectively. With these configurations, a high-efficiency internal combustion engine can be provided irrespective of which type is used.

A seventh solution of the present invention is directed to an internal combustion engine of any one of the first to sixth solutions, wherein the number of said independent combustion chambers per cylinder is plural and the number of operating ones of said independent combustion chambers per cylinder is changed according to the operating conditions of the engine. With this configuration, the independent combustion chambers can be used under high compression conditions over the entire operating range of the internal combustion engine by using them according to the operating conditions of the internal combustion engine, i.e., engine duty, for example, by using a small number of independent combustion chambers in light duty conditions where the efficiency of air filling is low and using all the independent combustion chambers in heavy duty conditions. Therefore, the combustion efficiency can be enhanced over the entire engine operating range.

An eighth solution of the present invention is directed to an internal combustion engine of any one of the first to seventh solutions, wherein the independent combustion chamber comprises a smaller number of independent combustion chambers than the number of cylinders and each said independent combustion chamber is configured to produce main combustion selectively for a plurality of said cylinders. With this configuration, the number of independent combustion chambers can be reduced, thereby contributing to simplification and size reduction of the engine structure.

A ninth solution of the present invention is directed to an internal combustion engine of any one of the first to eighth solutions, wherein the independent combustion chamber is connected to a super charger. With this configuration, the pressure of the independent combustion chamber, i.e., the effective compression ratio, can be increased, thereby providing high combustion efficiency.

A tenth solution of the present invention is directed to an internal combustion engine of the ninth solution, wherein the super charger is composed of one of a plurality of cylinders in the internal combustion engine that is of multi-cylinder type. With this configuration, there is no need to use a special super charger, which enables parts sharing and in turn provides cost reduction.

An eleventh solution of the present invention is directed to an internal combustion engine of any one of the first to tenth solutions, wherein the independent combustion chamber is formed substantially in the shape of a sphere. With this configuration, main combustion can be produced with the so-called S/V ratio kept small. Therefore, not only the combustion efficiency can be increased but also production of abnormal combustion due to end gas can be avoided unlike conventional internal combustion engines.

A twelfth solution of the present invention is directed to an internal combustion engine of any one of the first to eleventh solutions, wherein the independent combustion chamber includes a water injection device in addition to the fuel supply device. With this configuration, the ratio of specific heat can be increased by water injection. Therefore, combustion can be further activated. Furthermore, excessive increase in combustion temperature can be restrained, thereby restraining the production of nitrogen oxides.

As seen from the above, the present invention provides a high-compression ratio, high-efficiency internal combustion engine without causing any damage to engine components due to knocking.

Figure 1:
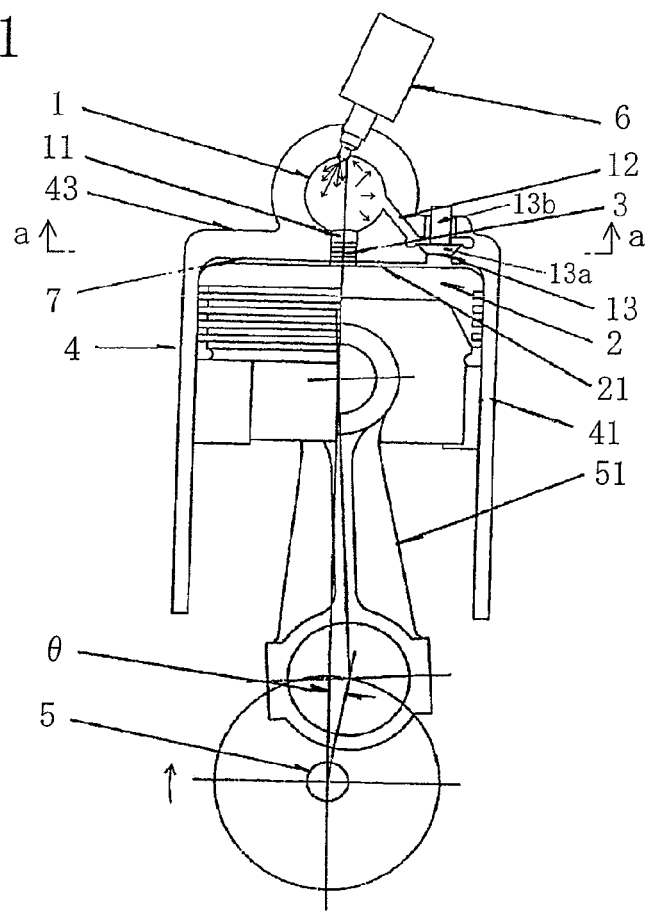
FIG. 1 is a cross-sectional view of an independent combustion chamber internal combustion engine according to a first embodiment of the present invention.

EXPLANATION OF REFERENCE NUMERALS 1 independent combustion chamber
2 piston
3 control valve
4 housing
6 fuel supply device
7 operating chamber
11 communication passage (first communication passage)
12 communication passage (second communication passage)
13 control valve (second control valve)

BEST MODE FOR CARRYING OUT THE INVENTION

As described below in detail, an embodiment of the present invention is an internal combustion engine for making suction, compression, explosion, expansion and exhaust strokes in an opening chamber of variable volume defined between a housing and a piston. The internal combustion engine includes: an independent combustion chamber of fixed volume, formed in the housing and provided with a fuel supply device, for independently producing combustion therein; at least one communication passage for communicating the independent combustion chamber with the operating chamber of variable volume; and a control valve for allowing introduction of compressed air from the operating chamber into the independent combustion chamber and providing injection of combustion gas from the independent combustion chamber into the operating chamber at specified timing, wherein the independent combustion chamber is configured to independently produce main combustion without communication with the operating chamber.

First Embodiment

Figure 2:
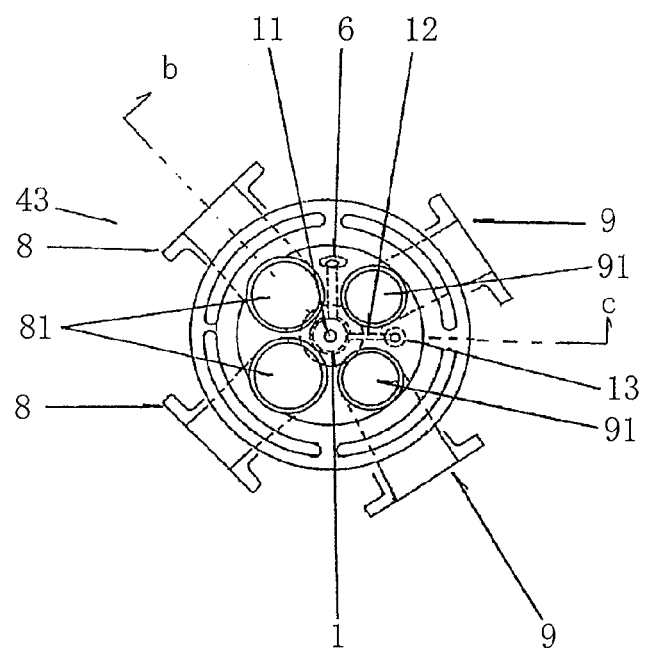
FIG. 2 is a view taken along the arrowed line a-a in FIG. 1.
Figure 3:
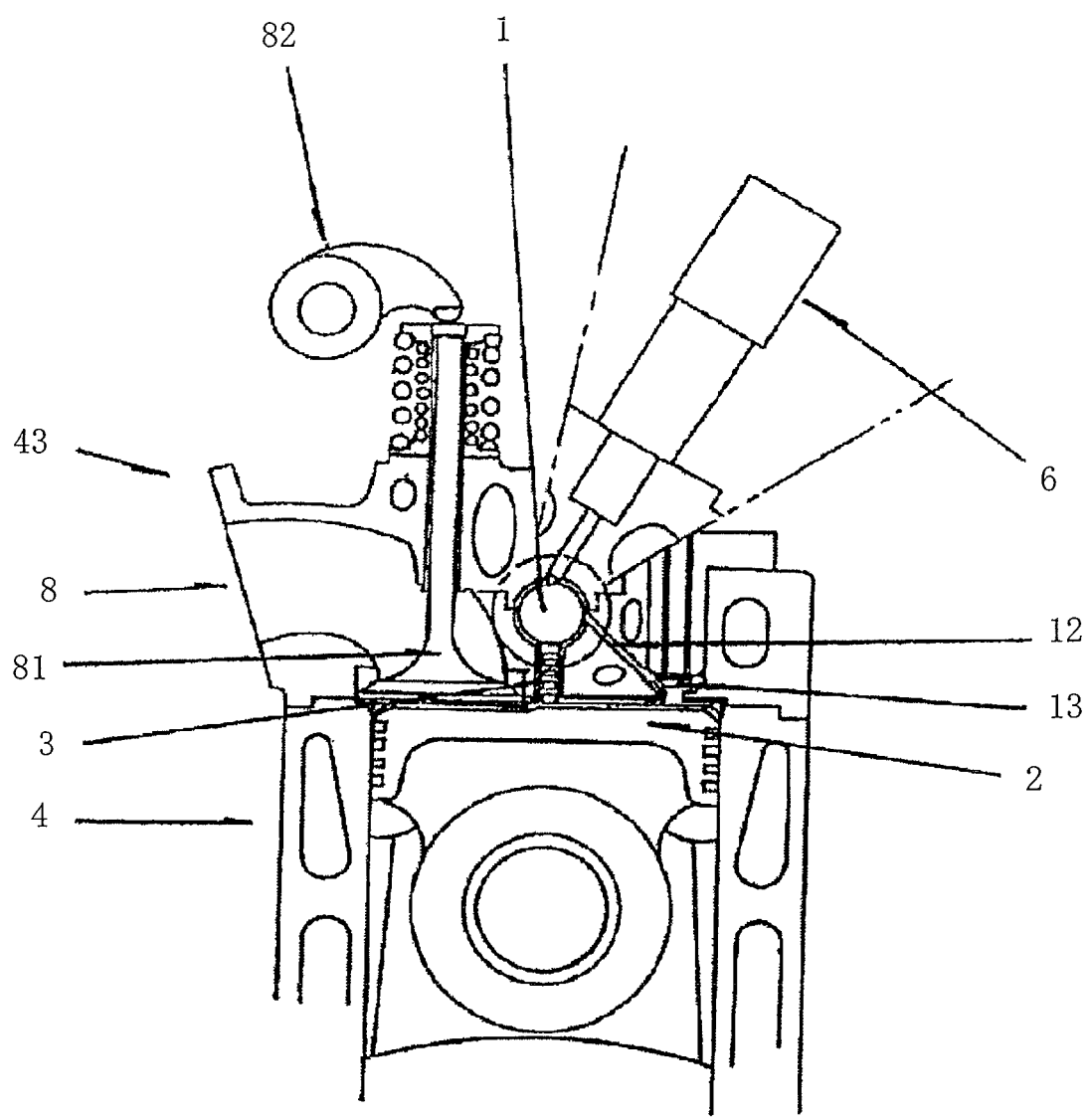
FIG. 3 is a view taken along the arrowed line b-c in FIG. 2.

An independent combustion chamber internal combustion engine of a first embodiment shown in FIGS. 1 and 2 is a so-called reciprocating internal combustion engine in which its suction, compression, explosion, expansion and exhaust strokes are made in an operating chamber 7 of variable volume defined between a housing 4 and a reciprocating piston 2. The internal combustion engine includes an independent combustion chamber 1 provided independently in the housing 4, two communication passages 11 and 12 for communicating the independent combustion chamber 1 with the variable-volume operating chamber 7, and first and second control valves 3 and 13 for controlling the states of communication of the communication passages 11 and 12, respectively.

The independent combustion chamber 1 is formed in a cylinder head 43 constituting part of the housing 4 and its volume is set, coupled with the volume of the operating chamber 7, to reach a super-high compression ratio much greater than compression ratios in normal diesel internal combustion engines, for example, a compression ratio of about 40. The independent combustion chamber 1 is formed substantially in the shape of a sphere to have the minimum surface area for a given volume and provided at the top with a fuel injection nozzle 6 as a fuel supply device. The fuel injection nozzle 6 need only be able to inject fuel at high pressure and need not be a nozzle excellent in atomization that would be needed for a conventional diesel engine. Since the interior of the independent combustion chamber 1 is under very high compression and produces main combustion independently of the operating chamber 7 even if the atomization performance thereof is inferior to some degree, abnormal combustion is less likely to occur therein. Furthermore, even if abnormal combustion occurs in the independent combustion chamber 1, this does not have any adverse effect on the piston 2 defining the operating chamber and parts surrounding the piston 2.

The first and second communication passages 11 and 12 communicate the variable-volume operating chamber 7 defined between the piston head 21 and the inner surface of the cylinder 41 serving as the housing 4 with the independent combustion chamber 1. The first communication passage 11 is formed to open axially into the independent combustion chamber 1, while the second communication passage 12 is formed to open thereinto in a direction tangent to the shape of the independent combustion chamber 1.

The first control valve 3 is constituted as a sub piston formed integrally with the top of the piston 2 and is configured to control the opening and closing of the operating chamber side aperture of the first communication passage 11 by reciprocating movement of the piston 2. The outer periphery of the sub piston 3 is formed with a plurality of annular grooves serving as a labyrinth packing and is configured to prevent combustion gas from leaking into the operating chamber 7. The opening and closing timings of the first control valve 3 are set, for example, to close the communication passage for a period of time from 30 degrees before top dead center of the compression stroke to 30 degrees after top dead center thereof and open it before and after that period of time. The opening and closing timings should be changed depending on the specification of the engine. The timing to initiate the valve closing is sufficient if it is set at a piston position before the fuel injection timing of the fuel injection nozzle and near the maximum pressure of the operating chamber. The timing to initiate the valve opening is sufficient if it is set at such a piston angular position that main combustion in the independent combustion chamber can be produced independently of the operating chamber and the action of combustion gas on the piston provides a maximum output. The first control valve 3 is not limited to the sub piston type and may be a poppet valve or a rotary valve. Its drive system may either be mechanical or electronic.

The second control valve 13 is disposed at the port of the second communication passage 12 close to the operating chamber and is constituted by a cone-shaped valve element 13a fittable to a valve seat and a stem 13b. The boundary between the valve element 13a and the stem 13b provides a pressure receiving surface that receives a gas pressure from the independent combustion chamber to urge the valve element 13a towards the valve seat. The pressure receiving surface is for ensuring that the closed position of the second control valve 13 is held in producing exposition combustion in the independent combustion chamber 1, namely, independently producing main combustion without communication with the operating chamber 7. The second control valve 13 is set to open within the range from 30 to 10 degrees before top dead center of the compression stroke and close when the internal pressure of the independent combustion chamber exceeds that of the operating chamber 7. The second control valve 13 may be a one-way valve urged one way by a spring or may be a valve mechanically or electrically controlled in synchronization with the rotation of a piston rod 5 serving as an output shaft.

Figure 4:
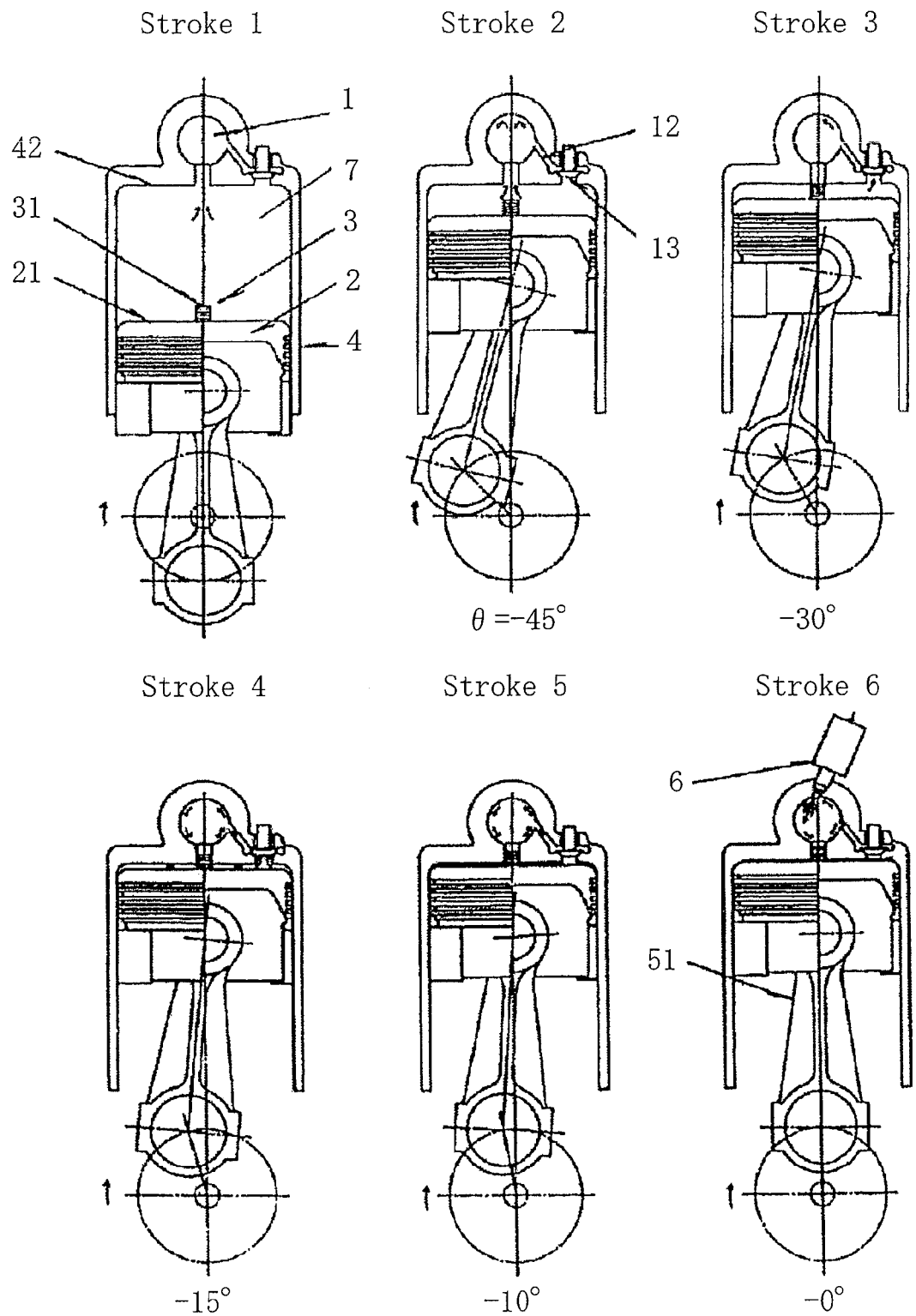
FIG. 4 shows some operating strokes of the engine according to the first embodiment.
Figure 5:
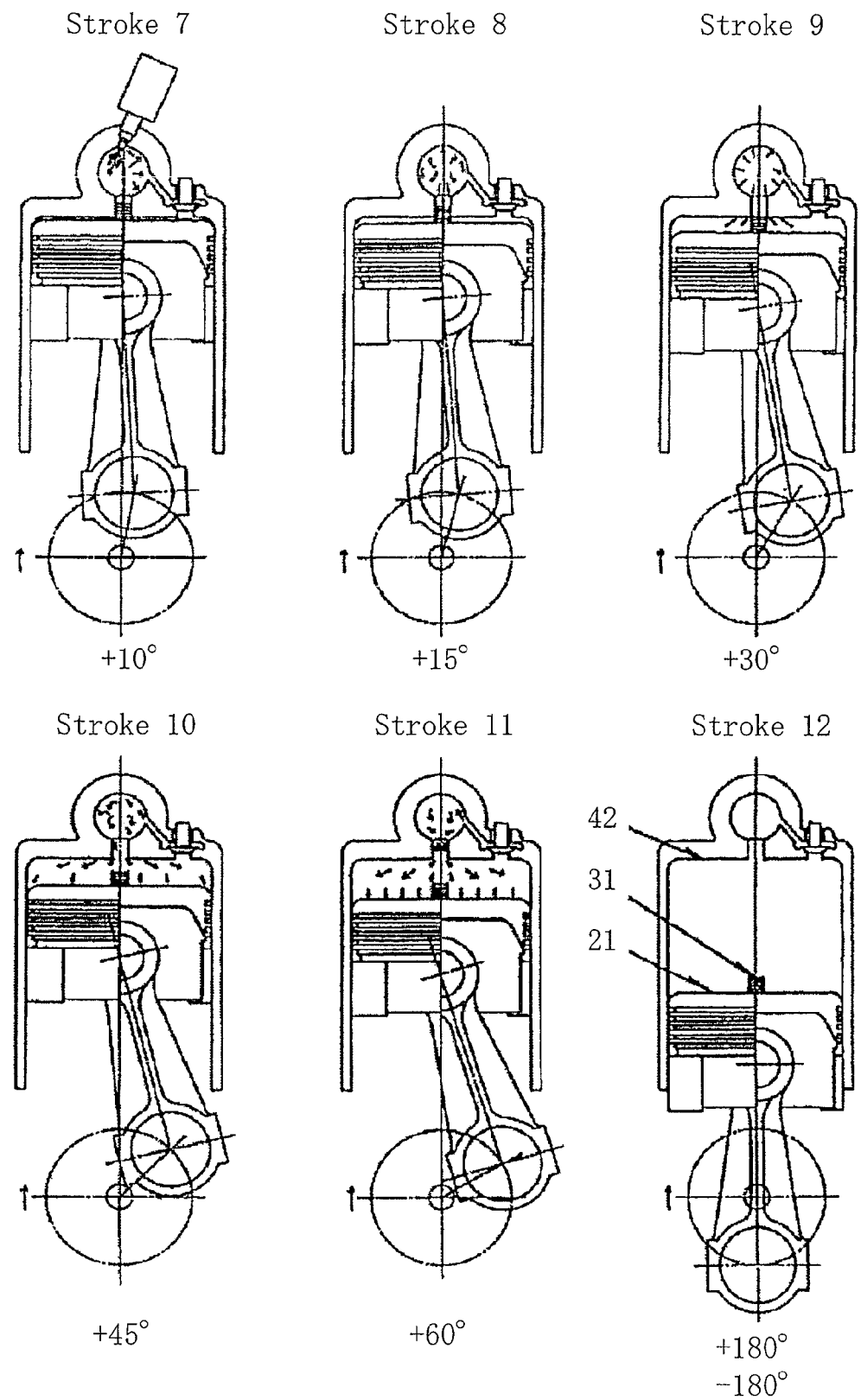
FIG. 5 shows the other operating strokes of the engine according to the first embodiment.

A description is given below of the operation of the independent combustion chamber internal combustion engine according to the first embodiment of the present invention with reference to FIGS. 4 and 5 (showing from stroke 1 to stroke 12).

First, in the state of stroke 1, the piston 2 is at the lowermost position and the operating chamber 7 is filled to full volume with air through an intake port 8. In this state, the sub piston 3 is also at the lowermost position together with the piston and the second control valve 13 is closed. Therefore, the independent combustion chamber 1 and the operating chamber 7 are communicated with each other through the first communication passage 11. The engine makes the transition from this state to the compression stroke.

In stroke 2, the angle θ of rotation of the piston rod is near −45 degrees (45 degrees before top dead center of the compression stroke), at which the engine is in the course of the compression stroke. The air filling the operating chamber is compressed and introduced through the first communication passage 11 into the independent combustion chamber 1, whereby the internal pressure of the independent combustion chamber 1 gradually increases.

In stroke 3, the angle θ of rotation of the piston rod is near −30 degrees, at which the sub piston 3 begins to close the first communication passage 11 with the upward movement of the piston 2. Concurrently, the air filling the operating chamber 7 opens the second control valve 13 and is thereby introduced through the second communication passage 12 into the independent combustion chamber 1.

In stroke 4, the angle θ of rotation of the piston rod is near −15 degrees, at which the engine comes close to the final stage of the compression stroke and the internal pressure of the independent combustion chamber 1 reaches a high pressure.

In stroke 5, the angle θ of rotation of the piston rod is near −10 degrees, at which the engine comes just before the final stage of the compression stroke and the second control valve 13 closes, thereby putting the interior of the independent combustion chamber 1 under high pressure and high temperature conditions. The second control valve 13 in this embodiment is configured to forcedly close at this timing.

In strokes 6 and 7, when the angle θ of rotation of the piston rod is near 0 degrees (top dead center of the compression stroke), fuel is injected from the fuel injection nozzle 6 and causes explosive combustion while being mixed with high-temperature air. In this case, the fuel from the fuel injection nozzle is not injected dispersedly as in conventional diesel internal combustion engines but is set to be injected collectively and instantly by a necessary amount. Therefore, the internal pressure of the independent combustion chamber 1 abruptly rises together with the occurrence of a shock wave. Such explosive combustion with a shock wave independently occurs in the independent combustion chamber 1 and the shock wave does not directly act on the piston 2 defining the operating chamber 7 and other surrounding parts such as seals.

In stroke 8, the angle θ of rotation of the piston rod is near +15 degrees, at which the operating chamber makes the transition to the expansion stroke. The operating chamber 7 gradually increases its volume from the top dead center of the compression stroke and begins to reduce the internal pressure. In this state, the independent combustion chamber 1 independently produces combustion without communication with the operating chamber 7, during which an initially produced shock wave is damped. In addition, because the explosion pressure can be retained in spite of changes in the angle of rotation, combustion occurs earlier, the fuel can be burned earlier even at a large amount and the interior of the independent combustion chamber can be kept under high temperature and high pressure conditions until the communication passage 11 is opened. This thermal equilibrium of combustion continues to near an angle θ of rotation of the piston rod of +20 degrees.

In strokes 9, 10 and 11, when the angle θ of rotation of the piston rod is +30 to +60 degrees, the first communication passage 11 is opened upon downward movement of the sub piston 3 involved in downward movement of the piston 2. The opening of the first communication passage 11 causes high-pressure combustion gas in the independent combustion chamber 1 to be instantly injected into the operating chamber 7, so that the gas pressure moves the piston 2 downward. In this case, since the injection of combustion gas through the first communication passage 11 is performed in a relatively short period of time, the pressure change in the operating chamber 7 shows an abrupt change as in an Otto cycle. Therefore, if the fuel injection timing is appropriately set, this provides increased efficiency analogous to that due to an Otto cycle, coupled with increased efficiency under a high compression ratio.

In stroke 12, the angle θ of rotation of the piston rod is near ±180 degrees, at which the piston reaches bottom dead center so that the expansion stroke ends. Furthermore, an exhaust port 9 is opened so that the engine makes the transition to the exhaust stroke.

Second Embodiment

Figure 6:
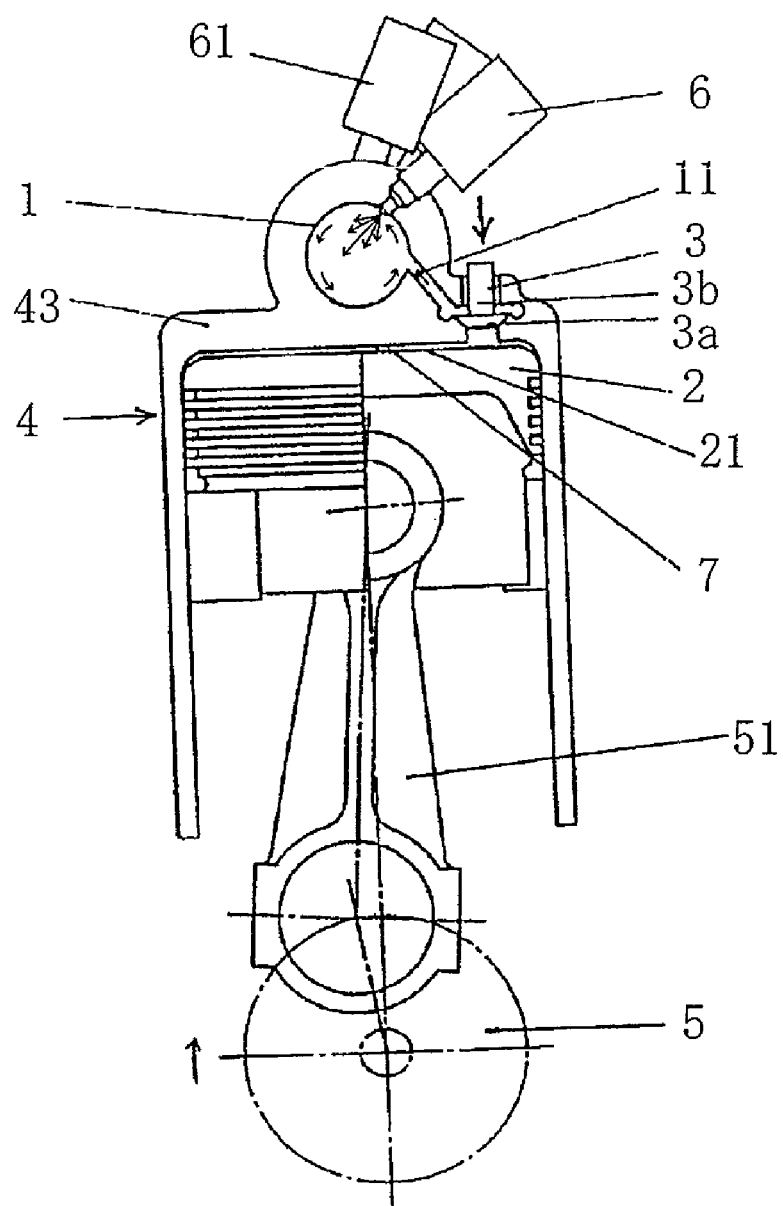
FIG. 6 is a cross-sectional view of an independent combustion chamber internal combustion engine according to a second embodiment of the present invention.

Next, a description is given of a second embodiment of the present invention shown in FIG. 6. The same parts as in the first embodiment and corresponding parts are identified by the same reference numerals and detailed description thereof is not given.

The independent combustion chamber internal combustion engine according to the second embodiment shown in FIG. 6 is an internal combustion engine in which its suction, compression, explosion, expansion and exhaust strokes are made in an operating chamber 4 of variable volume defined between a housing 4 and a piston 2. The internal combustion engine includes: an independent combustion chamber 1 of fixed volume, formed in the housing 4 and provided with a fuel supply means 6, for independently producing combustion therein; a single communication passage 11 for communicating the independent combustion chamber 1 with the operating chamber 7 of variable volume; and a control valve 3 for allowing introduction of compressed air from the operating chamber 7 into the independent combustion chamber 1 and providing injection of combustion gas from the independent combustion chamber 1 into the operating chamber 7 at specified timing, wherein the independent combustion chamber 1 is configured to independently produce main combustion without communication with the operating chamber 7.

Though the independent combustion chamber internal combustion engine in the first embodiment employs two communication passages, the independent combustion chamber internal combustion engine in the second embodiment is characterized in that a single communication passage 11 communicates the operating chamber with the independent combustion chamber 1, the above-mentioned main combustion in the independent combustion chamber 1 is produced by a single control valve 3 disposed at the single communication passage 11 and high-pressure gas obtained under a high compression ratio is introduced into the operating chamber 7 at specified timing. The communication passage 11 is made open to the independent combustion chamber 1 in a direction tangent to the shape of the independent combustion chamber 1 to produce a swirl in the independent combustion chamber 1 upon introduction of compressed air. The communication passage 11 has the control valve 3 disposed near its operating chamber side aperture. The control valve 3 is configured, like the opening and closing timings of the sub piston 3 serving as the first control valve 3 in the first embodiment, to close from 15 degrees before top dead center of the compression stroke to 30 degrees after top dead center thereof and open beyond 30 degrees after top dead center thereof. The control valve 3 includes, like the second control valve 13 in the first embodiment, a valve element 3a and a stem 3b and has a pressure receiving surface formed at the boundary between them to urge the valve element 3a towards the valve seat upon action of combustion gas thereon. Therefore, since the independent combustion chamber internal combustion engine of the second embodiment has a smaller number of communication passages and a smaller number of control valves than that of the first embodiment, its structure can be simplified accordingly. In this embodiment, not only the fuel injection nozzle but also a water injection nozzle 61 are disposed. Through the injection of water into the independent combustion chamber, the combustion temperature can be decreased, thereby contributing to reduction in nitrogen oxides.

Figure 7:
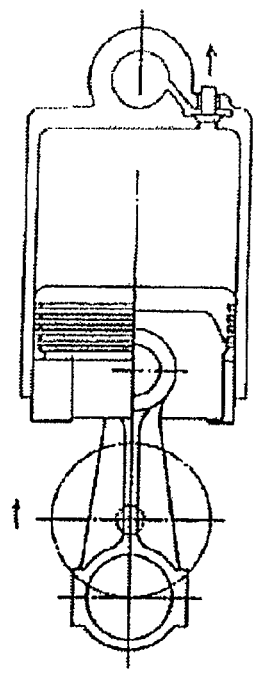
FIG. 7 shows some operating strokes of the engine according to the second embodiment.
Figure 7:
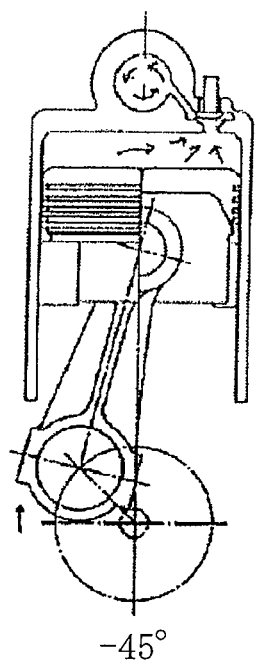
Figure 7:
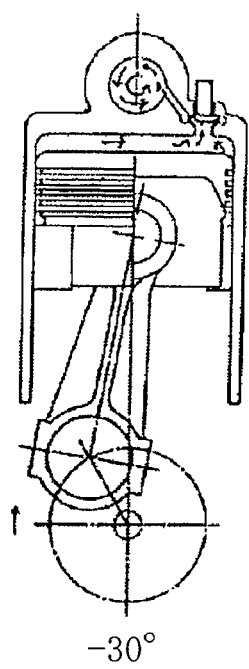
Figure 7:
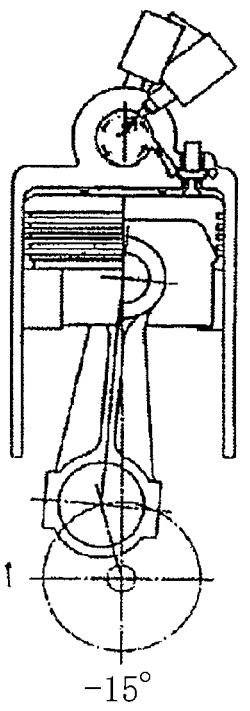
Figure 7:
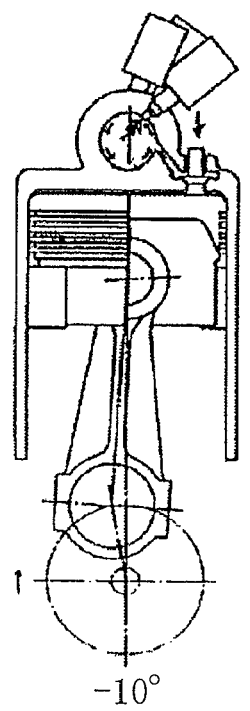
Figure 7:
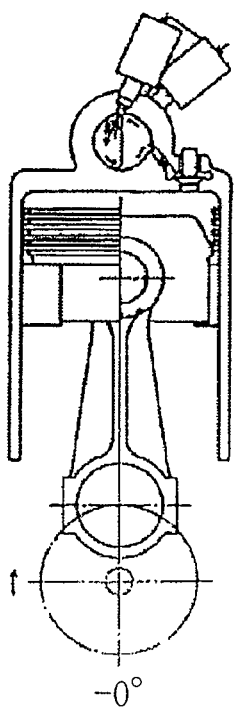
Figure 8:
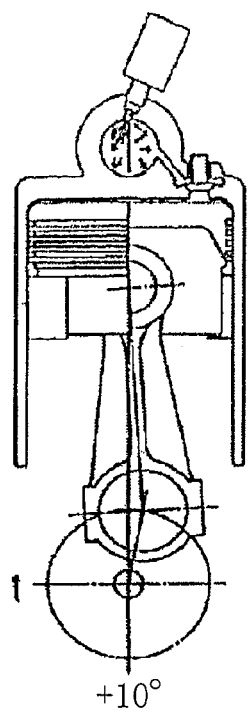
FIG. 8 shows the other operating strokes of the engine according to the second embodiment.
Figure 8:
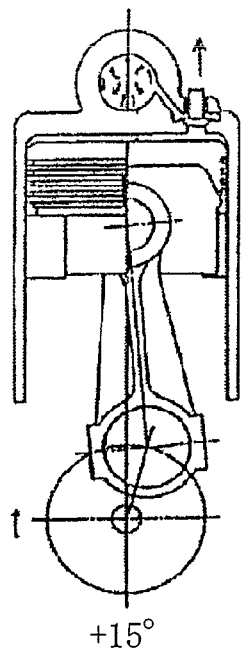
Figure 8:
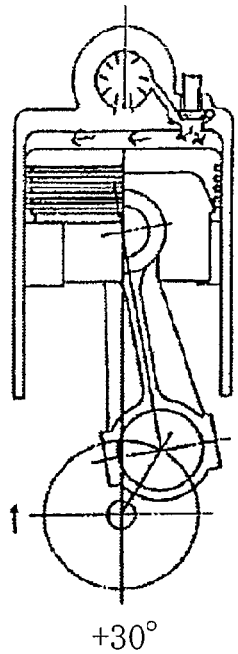
Figure 8:
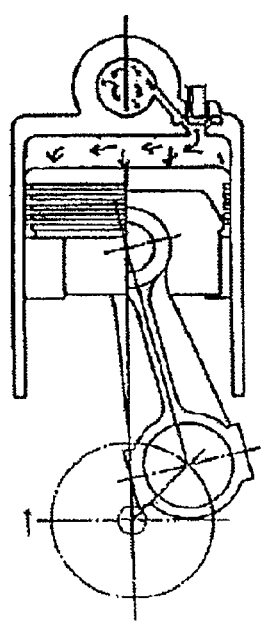
Figure 8:
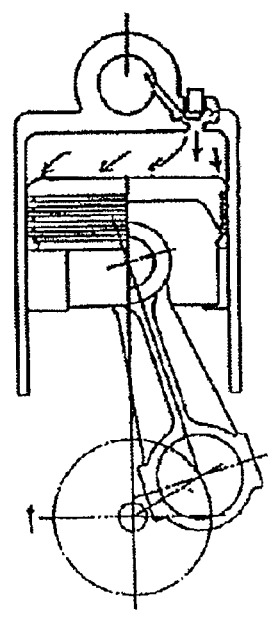
Figure 8:
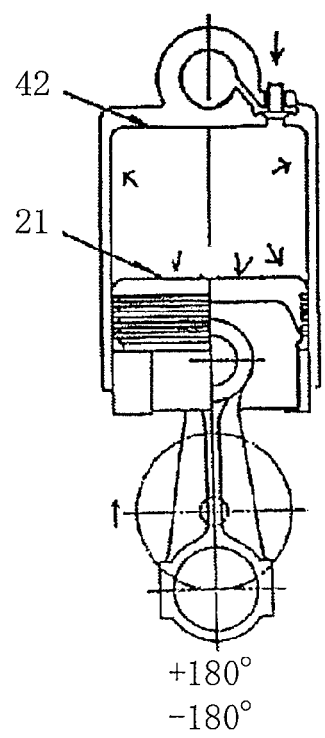

As shown in FIGS. 6 and 7, the independent combustion chamber internal combustion engine of the second embodiment having the above configuration operates substantially in the same strokes as the twelve strokes in the first embodiment.

Third Embodiment

Figure 9:
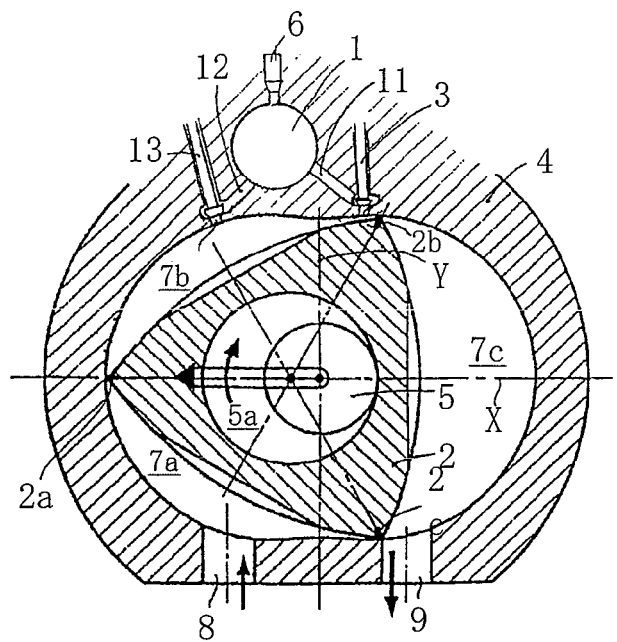
FIG. 9 is a cross-sectional view of an independent combustion chamber internal combustion engine according to a third embodiment of the present invention.
Figure 10:
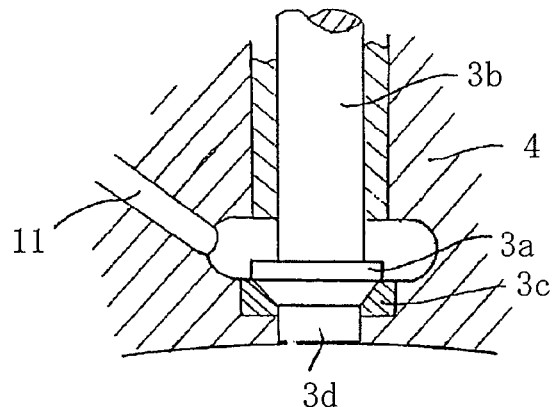
FIG. 10 is a partly enlarged view of FIG. 9.
Figure 11:
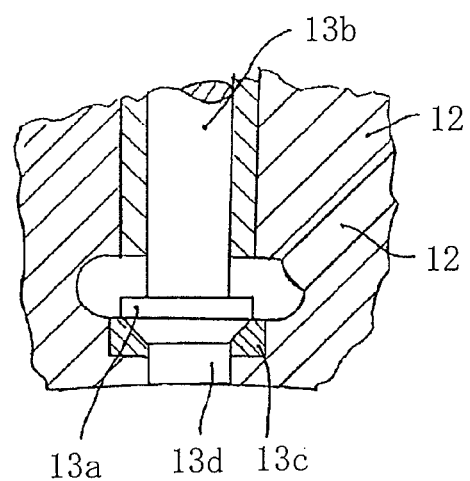
FIG. 11 is a partly enlarged view of FIG. 9.

An independent combustion chamber internal combustion engine according to a third embodiment of the present invention shown in FIGS. 9 to 11 is an application for a rotary internal combustion engine and, as in the first and second embodiments, provides a high-efficiency independent combustion chamber internal combustion engine. FIG. 9 relates to a self-igniting rotary internal combustion engine that is an independent combustion chamber internal combustion engine of the present invention. The rotary internal combustion engine includes a rotor housing 4 having a trochoid inner periphery and a triangular rotor 2 serving as a piston for planetary rotation along the inner periphery of the housing 4.

Three separated operating chambers 7a, 7b and 7c are defined between the rotor housing 4 and the rotor 2. Each operating chamber changes its volume with the rotation of the rotor 2, initiates air intake from top dead center of the suction stroke, reaches the maximum volume at bottom dead center of the suction stroke, gradually decreases its volume from the bottom dead center and reaches the minimum volume at top dead center of the compression stroke. Each operating chamber gradually increases again its volume from top dead center of the compression stroke and reaches the maximum volume at bottom dead center of the exhaust stroke. Thus, each operating chamber repeats the suction, compression, explosion, expansion and exhaust strokes by changing its volume with the planetary rotation of the rotor 2 and its generated power is extracted as a driving force through an eccentric shaft 5 serving as an output shaft.

The respective vertices of the rotor 2 are provided with respective apex seals 2a, 2b and 2c each of which seals between adjacent operating chambers. The eccentric shaft 5 has an eccentric part 5a and the eccentric part 5a pivotally bears the rotor 2. The amount of offset of the eccentric shaft 5 is set so that the eccentric shaft 5 rotates three turns for every one turn of the rotor 2.

The rotor housing 4 has an intake port 8 and an exhaust port 9 provided in one side thereof with respect to its long axis X and an independent combustion chamber 1 of the present invention provided in the other side. The independent combustion chamber 1 has a spherical shape and is communicated through a first communication passage 11 and a second communication passage 12 with the operating chamber coming at top dead center of the compression stroke. The first communication passage 11 is located on the leading side of the housing 4 with respect to the short axis Y and opens into the operating chamber coming at bottom dead center of the exhaust stroke in the vicinity of the trailing side apex seal. The second communication passage 12 is located on the trailing side of the housing 4 with respect to the short axis Y and opens into the operating chamber coming at bottom dead center of the suction stroke in the vicinity of the leading side apex seal.

The first communication passage 11 is provided with a first control valve 3 electrically or mechanically controlled to close before the fuel injection timing of the fuel injection nozzle 6 and open at specified timing near top dead center of the compression stroke (for example, 20 to 30 degrees after top dead center of the compression stroke). The first control valve 3 is for allowing the independent combustion chamber 1 to produce main combustion while being shut off from the operating chamber 7. Even if abnormal combustion such as early ignition occurs in the independent combustion chamber 1, its combustion pressure does not directly act on the rotor surface but is sealed within the independent combustion chamber 1 until a particular timing. As shown in an enlarged view of FIG. 10, the first control valve 3 includes a valve element 3a fittable to a valve seat 3c and a stem 3b. A column part 3d at the distal end of the valve element 3a is configured to loosely fit into the operating chamber side aperture of the first communication passage 3 and the end of the column part 3d is arranged as close as possible to the trochoid inner periphery. If the end of the column part 3d is located outwardly of the trochoid inner periphery, a dead volume is created in the aperture, which causes pressure escape to the adjacent operating chamber during passage of the apex seal. Therefore, the dead volume needs to be decreased as much as possible.

The second communication passage 12 is provided with a second control valve 13 for allowing working gas (compressed air) to flow from the operating chamber to the independent combustion chamber 1 and inhibiting the working gas from flowing out of the independent combustion chamber 1 into the operating chamber. As shown in a partly enlarged view of FIG. 11, the second control valve 13 is constituted by a cone-shaped valve element 13a fittable to a valve seat 13c and a stem 13b and is normally urged in the closing direction by a spring or the like. The second control valve 13 is configured to open the second communication passage 13 only when the operating chamber side pressure is higher than the pressure in the independent combustion chamber 1. The distal end of the valve element 13a is provided with a column part 13d and the column part 13d is arranged, like the first control valve, close to the trochoid surface to minimize the dead volume in the aperture.

The independent combustion chamber rotary internal combustion engine of the present invention having the above configuration operates as follows.

The three operating chambers 7a, 7b and 7c defined by the inner periphery of the rotor housing 4 and the rotor flank surfaces are held air-tight between each adjacent pair of the operating chambers by the apex seals 2a, 2b and 2c at the vertices of the rotor 2. Each operating chamber independently changes its volume with the rotation of the rotor 2 and makes the suction, compression, explosion, expansion and exhaust strokes.

In the state of FIG. 9, the operating chamber 2a is communicated with the intake port 8 and is in an initial stage of the suction stroke. The rotation of the rotor 2 progresses from this state and air is sucked in until the apex seal 2c on the trailing side of the operating chamber 2a passes through the intake port 8 at 20 degrees after bottom dead center of the suction stroke. Then, the chamber volume gradually decreases so that the sucked air is gradually compressed to substantially make the transition to the compression stroke. In this course, when the apex seal 2a on the leading side of the operating chamber 7a passes through the aperture of the second communication passage 13 so that the aperture of the second communication passage 13 opens into the operating chamber 7a, the valve element 13a of the second control valve 13 moves away from the valve seat 13c to communicate the independent combustion chamber 1 with the operating chamber 7a through the second communication passage 12, whereby the compressed air in the operating chamber 7a is introduced into the independent combustion chamber 1.

While in the compression stroke the apex seal 2a on the leading side is still short of the aperture of the first communication passage 11 and the aperture opens into the preceding operating chamber 7b being in the expansion stroke, the independent combustion chamber 1 is communicated through the first communication passage 11 and the second communication passage 13 with the preceding operating chamber 7b being in the expansion stroke and the succeeding operating chamber 7a being in the compression stroke, respectively. During the time, for a period of time when the preceding operating chamber 7b has a higher pressure than the succeeding operating chamber 7a, the second control valve 13 closes, which avoids the occurrence of escape of compressed air and escape of combustion gas in the preceding operating chamber. When the preceding operating chamber 7b enters the second half of the expansion stroke, however, the pressure relation between the preceding operating chamber 7b and the succeeding operating chamber 7a is reversed. Since in this stage the first communication passage 11 is closed by the first control valve 3, the compressed air in the succeeding operating chamber 7a is accumulated in the independent combustion chamber 1 and does not escape into the preceding operating chamber 7b.

When the compression stroke in the operating chamber 7a further progresses from the above state, the aperture of the first communication passage 11 also opens into the operating chamber 7a and the internal pressure of the independent combustion chamber 1 gradually becomes higher and higher. Then, the internal pressure of the independent combustion chamber 1 reaches the maximum at top dead center of the compression stroke at which the operating chamber 7a reaches the minimum volume. In this state, the air in the independent combustion chamber 1 is under high temperature conditions owing to adiabatic compression and, at this time, fuel is injected from the fuel injection nozzle 6.

The injected fuel ignites itself in the course of mixture with high-temperature and high-pressure air and begins to combust explosively. At the time, both the first control valve 3 and the second control valve 13 are closed and the independent combustion chamber 1 produces explosive combustion independently of the operating chamber 7a. Therefore, even if abnormal combustion such as early ignition occur, the initial pressure is smoothed in the independent combustion chamber 1 and does not directly act on the rotor 2.

Next, at 20 degrees after top dead center of the compression stroke, the first control valve 3 is made open so that high-pressure combustion gas is injected into the operating chamber 7a. The pressure of the combustion gas acts on the flank surfaces of the rotor 2 and power thus generated is transmitted to the eccentric shaft 5. This action is performed throughout the expansion stroke and continued until the apex seal 2a on the leading side of the operating chamber 7a passes through the exhaust port 9. Thereafter, the operating chamber 7a makes the transition to the exhaust stroke, whereby the combustion gas in the operating chamber 7a is sequentially exhausted through the exhaust port 9.

Fourth Embodiment

Figure 12:
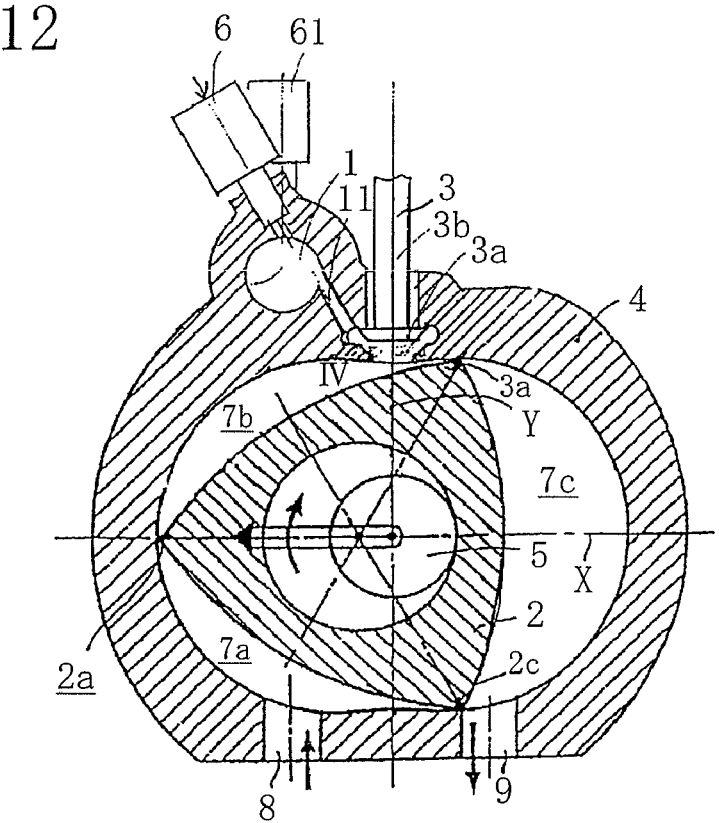
FIG. 12 is a cross-sectional view of an independent combustion chamber internal combustion engine according to a fourth embodiment of the present invention.

An independent combustion chamber internal combustion engine according to a fourth embodiment of the present invention shown in FIG. 12 is an application for a rotary internal combustion engine, like the third embodiment. Though in the third embodiment two communication passages are provided, this embodiment is characterized in that the whole structure is simplified by providing a single communication passage. In this embodiment, the communication passage 11 for communicating the independent combustion chamber 1 with the operating chamber opens into the trochoid inner periphery in the vicinity of the short axis thereof and is controlled to come into and away from communication with the operating chamber by the control valve 3 near the aperture of the communication passage 11. The control valve 3 is controlled in terms of its opening and closing timings, for example, to close from 20 degrees before top dead center of the compression stroke to 20 degrees after top dead center thereof and open for the other range. Specifically, the timing to initiate the valve closing is sufficient if it is set at a piston position before the fuel injection timing of the fuel injection nozzle 6 and near the maximum pressure of the operating chamber. The timing to initiate the valve opening is sufficient if it is set at such a piston angular position that main combustion in the independent combustion chamber 1 can be produced independently of the operating chamber and the action of combustion gas on the rotor 2 provides a maximum output. If the position of the operating chamber side aperture of the communication passage is located on the leading side of the operating chamber with respect to the short axis, this is more effective in efficiently extracting combustion gas in the independent combustion chamber as an output. In other words, if the operating chamber side aperture of the communication passage is located on the trailing side of the operating chamber with respect to the short axis, the trailing side apex seal passes through the aperture of the communication passage in an initial stage of the compression stroke so that the communication passage opens into the succeeding operating chamber. This is not desirable because not only the combustion pressure is not effectively used but also it acts on the succeeding operating chamber to produce reverse torque.

Fifth Embodiment

Figure 13:
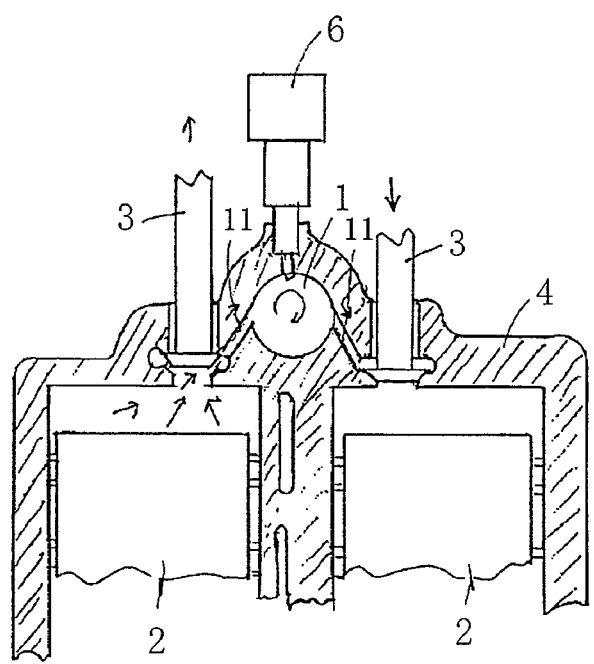
FIG. 13 is a cross-sectional view of an independent combustion chamber internal combustion engine according to a fifth embodiment of the present invention.

A fifth embodiment of the present invention shown in FIG. 13 is an application for a multi-cylinder internal combustion engine and is configured to make the number of independent combustion chambers 1 smaller than that of cylinders and share one independent combustion chamber 1 among a plurality of the cylinders using operating phase differences among them. The sharing of the independent combustion chamber provides a simplified whole structure and a reduced size of the engine.

Figure 14:
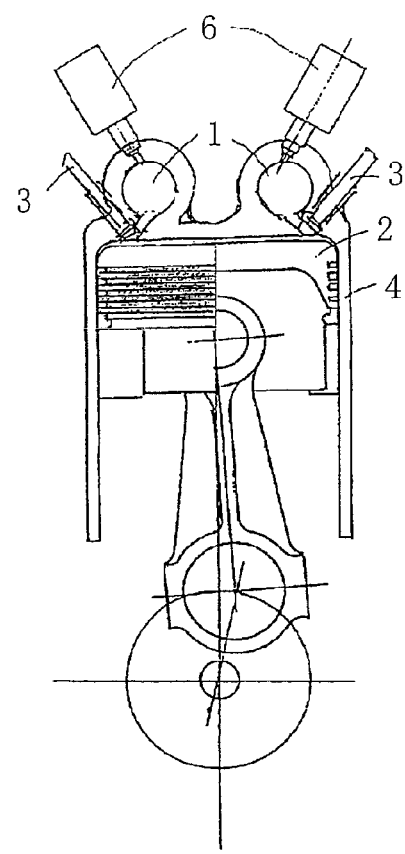
FIG. 14 is a cross-sectional view of an independent combustion chamber internal combustion engine according to a sixth embodiment of the present invention.

A sixth embodiment of the present invention shown in FIG. 14 is configured so that two independent combustion chambers are provided for every one cylinder and selectively used according to the engine operating conditions. Specifically, in light duty conditions where the amount of air filling the operating chamber is small, one of the two independent combustion chambers is closed and the other is operated to increase the compression ratio. On the other hand, in heavy duty conditions, both the independent combustion chambers are operated. With this configuration, fuel can be combusted under high compression conditions over the entire engine operating range, which further increases fuel efficiency. Furthermore, when the plurality of independent combustion chambers are communicated with the operating chamber at the start of the internal combustion engine, the starting torque can be decreased, thereby reducing the capacity of the cell motor.

Figure 15:
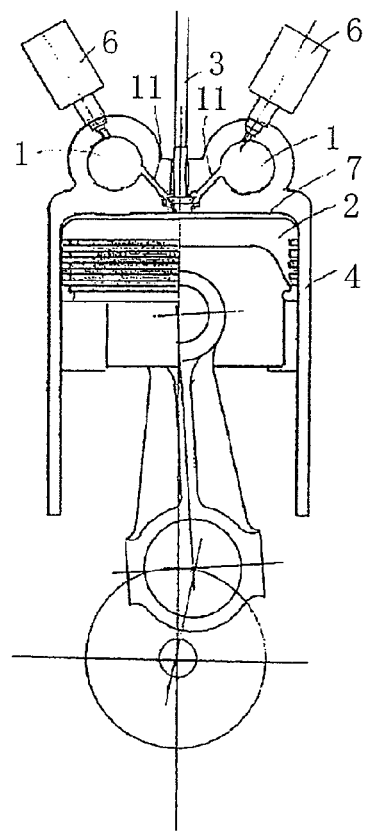
FIG. 15 is a cross-sectional view of an independent combustion chamber internal combustion engine according to a seventh embodiment of the present invention.

A seventh embodiment of the present invention shown in FIG. 15 is configured so that two independent combustion chambers are provided for every one cylinder, communication passages each communicating with associated one of the two independent combustion chambers are merged at a point located towards the operating chamber and a single control valve at the merge point controls the opening and closing of the communication passages. In this case, the number of independent combustion chambers for the number of cylinders is not limited to two and may be three or more.

Though in each of the above embodiments the filling of air is based on natural air intake, the amount of air filling the operating chamber may be increased using a super charger, which makes the compression ratio higher. In this case, a mechanical super charger may be used as the super charger. Alternatively, a particular cylinder in a multi-cylinder internal combustion engine may be used as a compressor and the compressor may provide a super charger.

Though the above embodiments are basically applications for a compression ignition diesel internal combustion engine, they may be of course applied to a spark ignition internal combustion engine.

Though in one of the above embodiments a water injection nozzle is illustrated, the water injection nozzle can be provided in each of the above embodiments as needed.

INDUSTRIAL APPLICABILITY

As described above, according to the present invention, damage due to knocking, such as breakage of the piston or breakage of parts connecting to the piston, do not occur, thereby providing high compression ratio and significantly improved combustion efficiency. Therefore, the present invention is applicable for various types of internal combustion engines.

The invention claimed is:

1. An internal combustion engine for making suction, compression, explosion, expansion and exhaust strokes in an operating chamber of variable volume defined between a housing and a piston, said internal combustion engine comprising:
    an independent combustion chamber of fixed volume, formed in the housing and provided with a fuel supply device, for independently producing main combustion therein;
    at least one communication passage for communicating the independent combustion chamber with the operating chamber of variable volume;
    a control valve for allowing introduction of compressed air from the operating chamber into the independent combustion chamber and providing injection of combustion gas from the independent combustion chamber into the operating chamber at specified timing after a top dead center of a compression stroke; and
    the control valve being configured to close the communication passage within a predetermined range from near the top dead center of the compression stroke to approximately 20 to 30 degrees after the top dead center thereof such that the predetermined range includes the top dead center and a fuel injection from the fuel supply device is timed to occur in the predetermined range to thereby independently produce main combustion in the independent combustion chamber without communication with the operating chamber.

2. The independent combustion chamber internal combustion engine of claim 1, wherein the communication passage comprises a single communication passage.

3. The independent combustion chamber internal combustion engine of claim 1, wherein the communication passage for every one said independent combustion chamber comprises a first communication passage and a second communication passage both communicating with said independent combustion chamber, the first communication passage is provided with a first control valve for allowing injection of combustion gas from the independent combustion chamber into the operating chamber at the specified timing, and the second communication passage is provided with a second control valve for allowing compressed working gas to flow from the operating chamber into the independent combustion chamber and inhibiting combustion gas from flowing out of the independent combustion chamber into the operating chamber.

4. The independent combustion chamber internal combustion engine of claim 3, wherein the first control valve is constituted as a sub piston formed on the piston reciprocating in the housing.

5. The independent combustion chamber internal combustion engine of claim 1, wherein said independent combustion chamber internal combustion engine comprises a reciprocating internal combustion engine.

6. The independent combustion chamber internal combustion engine of claim 1, wherein said independent combustion chamber internal combustion engine comprises a rotary internal combustion engine in which a polygonal rotor serving as the piston planetarily rotates in the housing having a trochoid inner periphery.

7. The independent combustion chamber internal combustion engine of claim 1, wherein the number of said independent combustion chambers per cylinder is plural and the number of operating ones of said independent combustion chambers per cylinder is changed according to the operating conditions of the engine.

8. The independent combustion chamber internal combustion engine of claim 1, wherein the independent combustion chamber comprises a smaller number of independent combustion chambers than the number of cylinders and each said independent combustion chamber is configured to produce main combustion selectively for a plurality of said cylinders.

9. The independent combustion chamber internal combustion engine of claim 1, wherein the independent combustion chamber is connected to a super charger.

10. The independent combustion chamber internal combustion engine of claim 9, wherein the super charger is composed of one of a plurality of cylinders in the internal combustion engine that is of multi-cylinder type.

11. The independent combustion chamber internal combustion engine of claim 1, wherein the independent combustion chamber is formed substantially in the shape of a sphere.

12. The independent combustion chamber internal combustion engine of claim 1, wherein the independent combustion chamber includes a water injection device in addition to the fuel supply device.

* * * * *